(12) United States Patent
Schuster

(10) Patent No.: US 9,162,334 B2
(45) Date of Patent: Oct. 20, 2015

(54) A-AXIS MACHINING APPARATUS

(71) Applicant: Helmut Schuster, Menhofer St. (DE)

(72) Inventor: Helmut Schuster, Menhofer St. (DE)

(73) Assignee: EMAG HOLDING GMBH, Salach (DE)

(*) Notice: Subject to any disclaimer, the term of this patent is extended or adjusted under 35 U.S.C. 154(b) by 455 days.

(21) Appl. No.: 13/766,842

(22) Filed: Feb. 14, 2013

(65) Prior Publication Data

US 2013/0210594 A1 Aug. 15, 2013

(30) Foreign Application Priority Data

Feb. 15, 2012 (DE) .................. 10 2012 002 982

(51) Int. Cl.
| | | |
|---|---|---|
| B23Q 3/157 | (2006.01) | |
| B23Q 1/48 | (2006.01) | |
| B23Q 7/03 | (2006.01) | |
| B23Q 7/04 | (2006.01) | |
| B23P 23/02 | (2006.01) | |
| B23Q 1/01 | (2006.01) | |
| B23Q 1/64 | (2006.01) | |
| B23Q 3/155 | (2006.01) | |
| B23Q 1/62 | (2006.01) | |
| B23B 3/06 | (2006.01) | |

(52) U.S. Cl.
CPC *B23Q 1/64* (2013.01); *B23Q 1/015* (2013.01); *B23Q 1/4852* (2013.01); *B23Q 1/4857* (2013.01); *B23Q 1/621* (2013.01); *B23Q 3/15513* (2013.01); *B23Q 3/15713* (2013.01); *B23Q 3/15733* (2013.01); *B23B 3/065* (2013.01); *B23Q 7/03* (2013.01); *B23Q 7/04* (2013.01); *Y10T 29/5114* (2015.01); *Y10T 82/2511* (2015.01); *Y10T 82/2514* (2015.01); *Y10T 409/305824* (2015.01); *Y10T 409/307672* (2015.01); *Y10T 409/309576* (2015.01); *Y10T 483/16* (2015.01); *Y10T 483/1705* (2015.01); *Y10T 483/1714* (2015.01); *Y10T 483/1755* (2015.01)

(58) Field of Classification Search
CPC .............. B23Q 1/4852; B23Q 1/4857; Y10T 409/305824; Y10T 409/30896; Y10T 409/308512; Y10T 409/307672; Y10T 409/309576; Y10T 483/1705; Y10T 483/1714; Y10T 483/16; Y10T 82/2511; B23C 1/14
USPC ............ 409/168, 224, 201, 216, 235; 483/18, 483/22, 14
See application file for complete search history.

(56) References Cited

U.S. PATENT DOCUMENTS

| | | | | |
|---|---|---|---|---|
| 4,987,668 | A * | 1/1991 | Roesch | 483/30 |
| 6,682,276 | B2 * | 1/2004 | Harami et al. | 409/134 |
| 7,591,620 | B2 * | 9/2009 | Schmidt et al. | 409/235 |
| 8,181,321 | B2 * | 5/2012 | Tullmann | 29/27 C |
| 2013/0206438 | A1 * | 8/2013 | Hessbrueggen | 173/39 |

FOREIGN PATENT DOCUMENTS

DE 102005039818 A 3/2007

* cited by examiner

*Primary Examiner* — Erica E Cadugan
(74) *Attorney, Agent, or Firm* — Andrew Wilford

(57) ABSTRACT

A machining apparatus has a machine frame having a vertical front wall and a pair of vertical side walls extending generally perpendicularly rearwardly from the front wall and a cross slide vertically displaceable on the front wall. A first holder is horizontally displaceable on the cross slide, and respective carriages horizontally displaceable generally perpendicular to the front wall on the side walls carry a mount between and pivotal in the carriages about a horizontal axis generally parallel to the front wall. A second holder is carried on the mount. One of the holders is adapted to hold and rotate a workpiece and the other of the holders to hold a tool. A drive is connected to both of the carriages for synchronously displacing same and thereby aligning the workpiece in the one holder with the tool in the other holder.

6 Claims, 3 Drawing Sheets

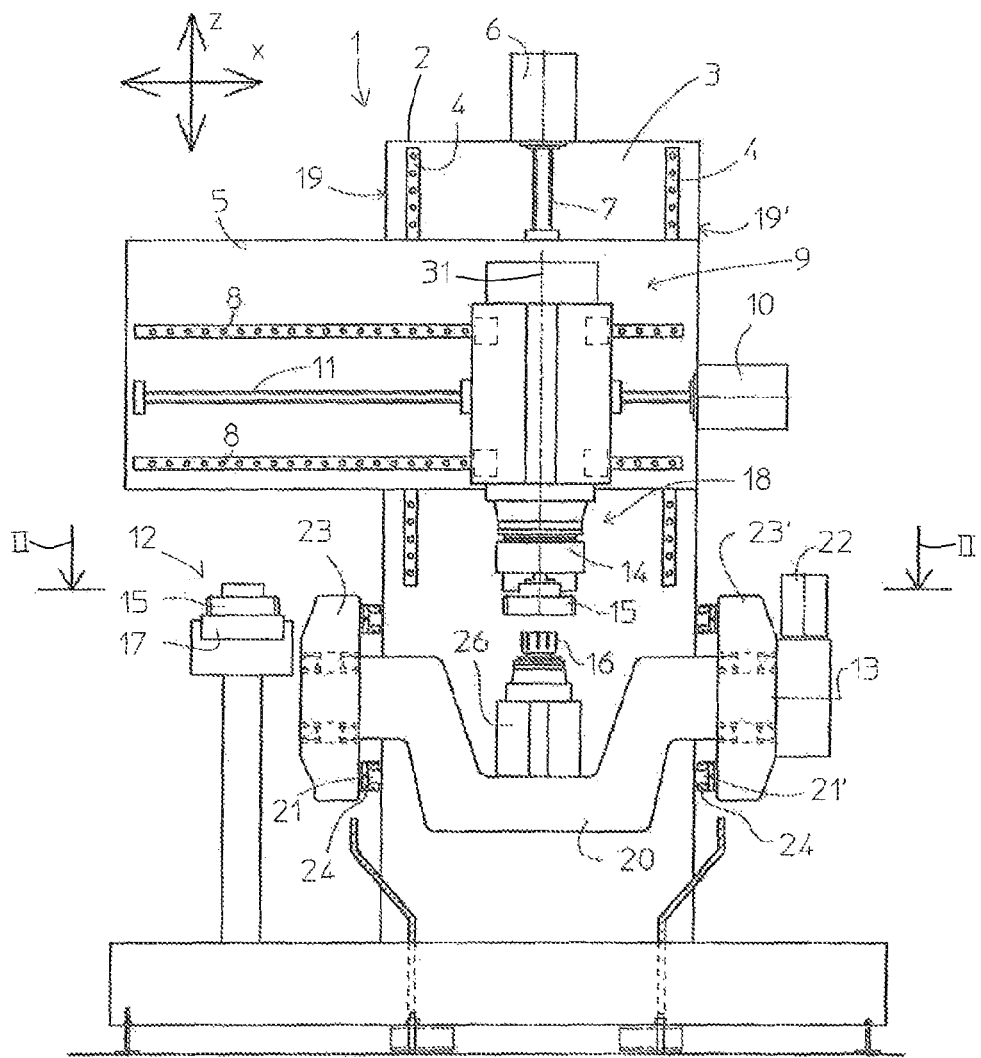

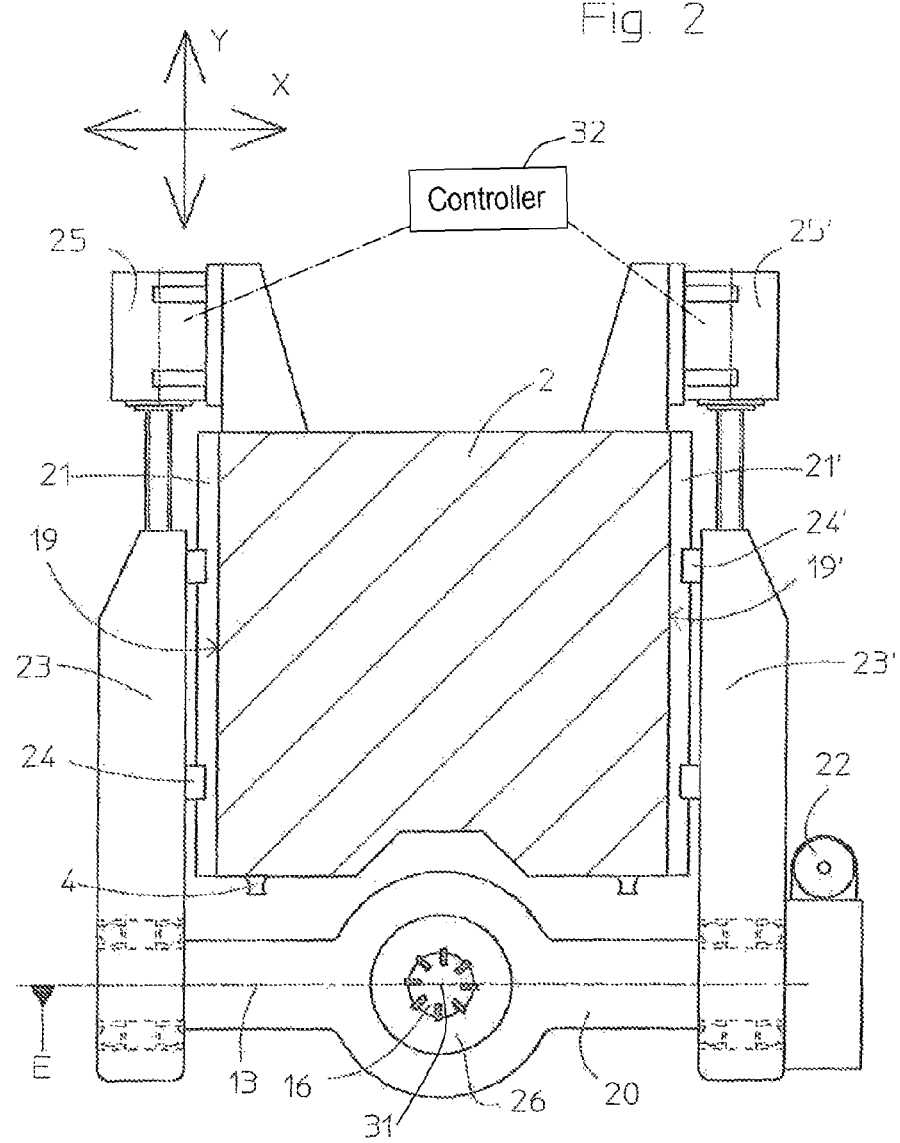

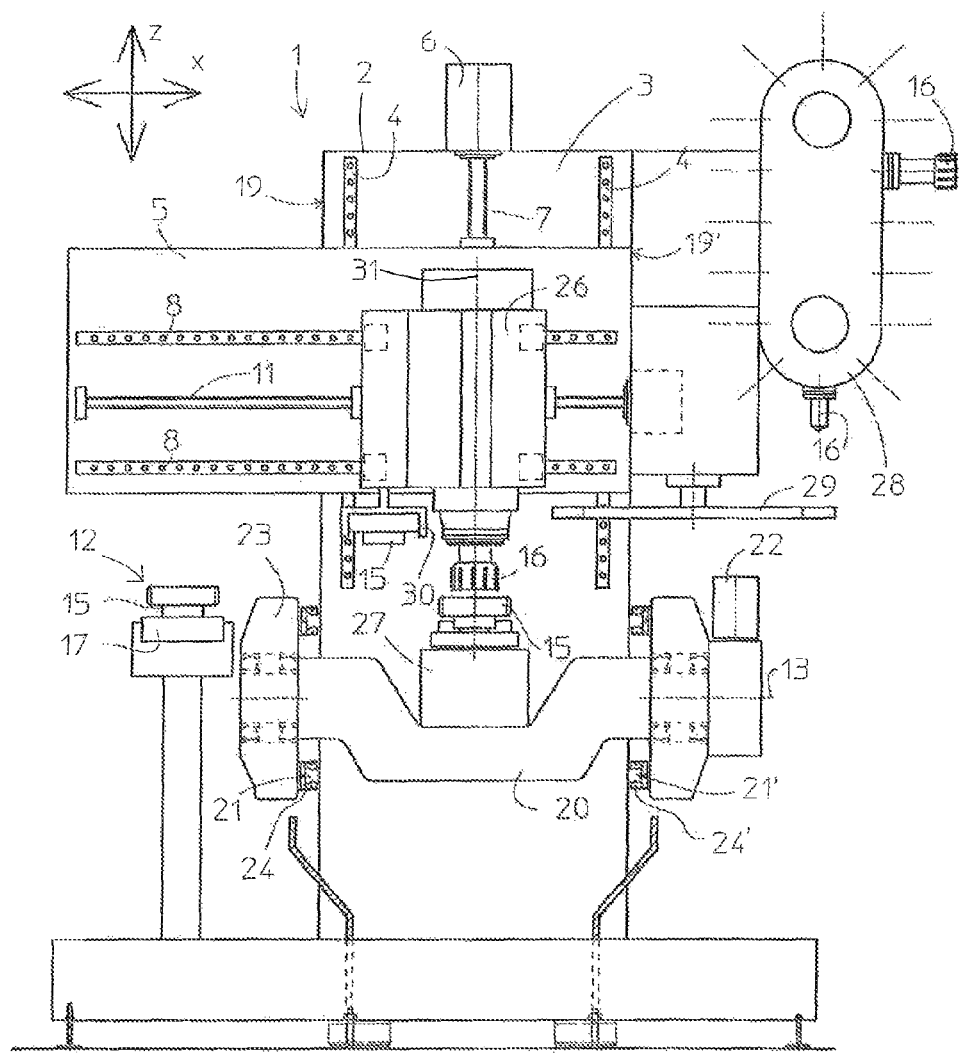

A-AXIS MACHINING APPARATUS

FIELD OF THE INVENTION

The present invention relates to a machining apparatus. More particularly this invention concerns such an apparatus where the workpiece is rotated about a so-called A-axis relative to a tool.

BACKGROUND OF THE INVENTION

As disclosed in German patent document 10 2005 039 818, an apparatus for machining rotates the workpiece about a normally vertical axis, the A-axis, and a tool holder that can pivot about a normally horizontal X-axis while being moveable along a vertical Y-axis toward and away from the rotating workpiece. The holder can interact with a magazine of tools to switch out the tool is using. This holder is typically mounted at one end in the machine frame and has a free end carrying a chuck adapted to hold the tool.

OBJECTS OF THE INVENTION

It is therefore an object of the present invention to provide an improved A-axis machining apparatus.

Another object is the provision of such an improved A-axis machining apparatus that overcomes the above-given disadvantages, in particular that is more compact than the prior-art such machines and that also provides a stiffer mount for the tool.

SUMMARY OF THE INVENTION

These objects are attained by a machining apparatus comprising a machine frame having a vertical front wall and a pair of vertical side walls extending generally perpendicularly rearwardly from the front wall and a cross slide vertically displaceable on the front wall. A first holder is horizontally displaceable on the cross slide, and respective carriages horizontally displaceable generally perpendicular to the front wall on the side walls carry a mount between and pivotal in the carriages about a horizontal axis generally parallel to the front wall. A second holder is carried on the mount. One of the holders is adapted to hold and rotate a workpiece and the other of the holders to hold a tool. A drive is connected to both of the carriages for synchronously displacing same and thereby aligning the workpiece in the one holder with the tool in the other holder.

Thus with this system as a result of the bilateral mounting of the pivotal mount the apparatus is very stiff. It can be precisely controlled to accurately position the workpiece or a tool.

According to the invention there is a vertical guide on the front wall on which the cross slide rides. Similarly there are respective horizontal guides on the side walls on which the carriages ride.

A conveyor defines a pickup/dropoff station laterally offset parallel to the plane from a work station between the holders and generally centrally in front of the front wall. The one holder for the workpiece is the first holder on the cross slide and is displaceable thereon between the stations. A manipulator carried on the cross slide is capable of shifting workpiece into and out of the pickup/dropoff station and into and out of the one holder.

The holder can instead be on the pivotal mount, in which case the apparatus further has according to the invention a tool magazine laterally offset in a plane of the front wall from a work station defined between the holders. The other holder for the tool is the first holder, and a carousel for transferring tools from the magazine to the first holder.

BRIEF DESCRIPTION OF THE DRAWING

The above and other objects, features, and advantages will become more readily apparent from the following description, reference being made to the accompanying drawing in which:

FIG. 1 is a partly schematic front elevational view of an apparatus according to the invention;

FIG. 2 is a large-scale section taken along line II-II of FIG. 1; and

FIG. 3 is a view like FIG. 1 of a variant on the invention.

DETAILED DESCRIPTION OF THE INVENTION

As seen in FIG. 1 a machining apparatus 1 has a normally columnar frame 2 with a square foot print and having two vertical, planar, and parallel side walls 19 and 19' bridged by a vertical and planar front wall 3. A pair of vertical guide rails 4 on the front wall 3 extending in a vertical Z-direction support a primary carriage or slide 5 in turn provided with horizontal guide rails 8 extending in an horizontal X-direction and supporting a workpiece holder 9. A drive 6 carried on the frame 2 has a spindle 7 that can vertically shift the slide 5 on the frame 1 and a similar drive 10 on the slide 5 has a spindle 11 that can shift the horizontally holder 9 on the slide 5.

The spindle drive 9 is equipped with a gripper or chuck 14 that can hold a workpiece 15 to be machined for rotation about a vertical axis 31. To one side of the columnar frame 2 is a loading/unloading station 12 offset in the X-direction from a working station 18 centered in front of the front wall 3. The slide 5 extends laterally over this station 12 so that the drive 10 can move the holder 9 between the stations 18 and 12 to pick up, drop off, and machine workpieces 15. A conveyor 17 extends perpendicular to the plane E of the front wall 3 to the station 12 to drop off unfinished workpieces 15 and carry off finished ones.

A V-shaped mount 20 extending across the front wall 3 has ends journaled in carriages 23 and 23' provided with shoes 24 and 24' riding on horizontal guide rails 21 and 21' on the side walls 19 and 19' of the frame 2. The mount 20 is pivotal about an axis 13 in the carriages 23 and 23' by a drive 22 carried on the carriage 23'. A holder 26 for tools 16 is carried on the pivotal mount 20 aligned with the axis 31. Spindle-screw drives 25 and 25' carried on the carriages 23 and 23' are synchronously operated by a controller 32 to shift the pivotal mount 20 in the horizontal Y-direction perpendicular to the plane E.

In the system of FIG. 3, the tool holder 26 is mounted on the guide rails 8 and a turntable 27 on the pivotal mount 20 carries the workpiece 15. A manipulator 30 carried on the cross slide 5 serves to transfer the workpieces 15 from the machining station 18 to the loading/unloading station 12. A tool magazine 28 on the side of the frame 2 holds the tools 16 that can be transferred from the magazine 28 to the holder 26 by a turntable-type transfer tool 29.

I claim:

1. A machining apparatus comprising:
   a machine frame column having a vertical front wall and a pair of vertical side walls extending generally perpendicularly rearwardly from the front wall;
   a cross slide vertically displaceable on the front wall;
   a first holder horizontally displaceable on the cross slide;

respective carriages horizontally displaceable generally perpendicular to the front wall on the side walls;

a mount between and pivotal in the carriages about a horizontal axis generally parallel to the front wall;

a second holder on the mount, one of the holders being adapted to hold and rotate a workpiece and the other of the holders being adapted to hold a tool; and drive means connected to both of the carriages for synchronously displacing same and thereby aligning the workpiece in the one holder with the tool in the other holder.

2. The machining apparatus defined in claim 1, further comprising a vertical guide on the front wall, the cross slide riding on the vertical guide.

3. The machining apparatus defined in claim 1, further comprising respective horizontal guides on the side walls, the carriages riding on the respective horizontal guides.

4. The machining apparatus defined in claim 1, further comprising conveyor means defining a pickup and dropoff station laterally offset from a work station that is located between the holders and generally centrally in front of the front wall, the one holder for the workpiece being the first holder on the cross slide and being displaceable thereon between the stations.

5. The machining apparatus defined in claim 1, further comprising a manipulator carried on the cross slide and capable of shifting a workpiece into and out of a pickup and dropoff station and into and out of the one holder.

6. The machining apparatus defined in claim 1, wherein the one holder is on the pivotal mount, the apparatus further comprising:

a tool magazine laterally offset in a plane of the front wall from a work station defined between the holders, the other holder for the tool being the first holder; and a carousel for transferring tools from the magazine to the first holder.

\* \* \* \* \*